US012800749B2

(12) United States Patent
Zanati et al.

(10) Patent No.: US 12,800,749 B2
(45) Date of Patent: Nov. 17, 2026

(54) CASCADED RADAR SYSTEM WITH IMPROVED CHIRP GENERATION

(71) Applicant: NXP B.V., Eindhoven (NL)

(72) Inventors: Abdellatif Zanati, Hamburg (DE); Martin Kessel, Bannewitz (DE); Feike Guus Jansen, Eindhoven (NL); Alessio Filippi, Eindhoven (NL); Nikita Petrov, Helmond (NL)

(73) Assignee: NXP B.V., Eindhoven (NL)

( * ) Notice: Subject to any disclaimer, the term of this patent is extended or adjusted under 35 U.S.C. 154(b) by 210 days.

(21) Appl. No.: 18/759,449

(22) Filed: Jun. 28, 2024

(65) Prior Publication Data

US 2026/0003066 A1 Jan. 1, 2026

(51) Int. Cl.

| | |
|---|---|
| ***G01S 13/87*** | (2006.01) |
| ***G01S 7/03*** | (2006.01) |
| ***G01S 7/35*** | (2006.01) |
| ***G01S 13/931*** | (2020.01) |

(52) U.S. Cl.

CPC .............. *G01S 13/878* (2013.01); *G01S 7/03* (2013.01); *G01S 7/352* (2013.01); *G01S 13/931* (2013.01)

(58) Field of Classification Search

None

See application file for complete search history.

(56) References Cited

U.S. PATENT DOCUMENTS

| | | | | |
|---|---|---|---|---|
| 10,830,868 | B2 | 11/2020 | Li et al. | |
| 10,983,193 | B2 | 4/2021 | Lin et al. | |
| 11,467,250 | B2 | 10/2022 | Li | |
| 2015/0153445 | A1 * | 6/2015 | Jansen .................... | G01S 7/032 342/195 |
| 2021/0072349 | A1 | 3/2021 | Mayer et al. | |

FOREIGN PATENT DOCUMENTS

| | | | |
|---|---|---|---|
| EP | 2881752 | A1 | 6/2015 |
| EP | 3859373 | A1 | 8/2021 |

* cited by examiner

*Primary Examiner* — Whitney Moore

(57) ABSTRACT

A device may include a first local oscillator signal generator configured to generate a first local oscillator signal. A device may include a first transmitter and a first receiver configured to transmit and receive first radar signals, respectively. A device may include a follower radar device, including: a second local oscillator signal generator configured to generate a second local oscillator signal, and a second transmitter and a second receiver configured to transmit and receive second radar signals, respectively. A device may include a controller configured to selectively configure the leader radar device to transmit the first local oscillator signal to the follower radar device and selectively configure the follower radar device to transmit the second local oscillator signal to the leader radar device.

19 Claims, 8 Drawing Sheets

CASCADED RADAR SYSTEM WITH IMPROVED CHIRP GENERATION

TECHNICAL FIELD

The present disclosure is directed in general to radar systems and associated methods of operation. In one aspect, the present disclosure relates to a civil automotive radar system that includes multiple radar transmitter and receiver devices and is configured to utilize control signals generated by two or more of the radar transmitter and receiver devices to control chirp signal transmission.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in civil automotive applications, automotive radar systems can be used to determine the distance and/or the speed of oncoming vehicles and other obstacles.

Civil automotive radar systems enable the implementation of advanced driver-assistance system (ADAS) functions that are likely to enable increasingly safe driving and, eventually, fully autonomous driving platforms. Although many different types and configurations of radar systems exist, many automotive applications utilize cascaded topologies that utilize several radar transmitter/receiver devices or subsystems that each transmit and receive radar signals to provide high resolution radar imaging. Those radar systems include a primary 'leader' radar device and a number of 'follower' devices. Control timing signals, such as clock signals, local oscillator (LO) signals, and other synchronization signals and commands are typically distributed by a first, leader radar device to the secondary, follower radar devices in order to maintain synchronicity and phase coherency between the radar signals being transmitted by each of the various radar transmitter and receiver devices, thereby enabling improved radar performance.

In these systems, it is typical that the radar system's operations are synchronized to a set of control timing signals generated by a single leader radar device, which are transmitted to the other follower radar devices. The radar signals generated by the various radar devices, typically in the form of chirp signals, include some portions (e.g., due to signal settling time) that are unusable for object detection.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Conventional cascaded automotive radar systems rely on clock signals generated by a single leader radar device to provide clock and other control signals that enable chirp signal transmission synchronization between the leader radar device and one or more follower radar devices. Although this cascaded arrangement between leader and follower devices, in which the leader device controls all radar device operations, can improve device synchronicity, the individual chirp signals require some setup time (e.g., due to signal settling) before the chirp signal becomes adequately stable to be useable for radar signal processing and object detection. That portion of the various chirp signals being transmitted is referred to here as the setup portion of the chirp signals.

Figure 1:
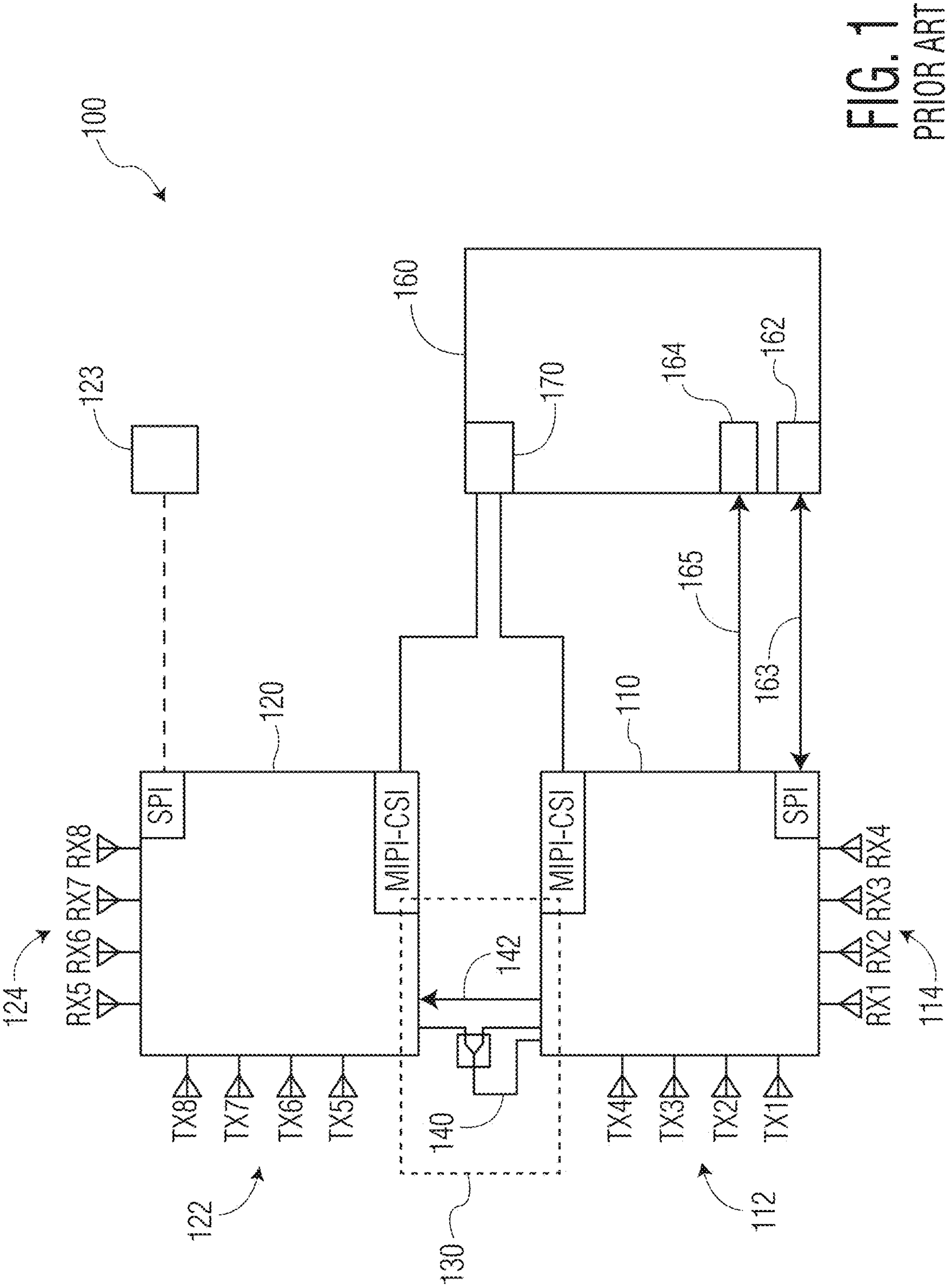
FIG. 1 PRIOR ART
FIG. 1 is a block diagram depicting functional components of an automotive radar system with components arranged in a cascade topology.

FIG. 1 is a block diagram depicting functional components of an automotive radar system 100 with radar device components arranged in a cascaded topology. In the depicted automotive radar system 100, the radar system cascades two radar devices. One of the two radar devices is defined as the leader radar device 110, which contains a first set of transmitter circuits coupled to transmit antennas 112 and a first set of receiver circuits coupled to receive antennas 114. The leader radar device 110 generates a number of controls signals 130 (e.g., clock signals and local oscillator (LO) signals) that are distributed via electrical connections to one or more follower radar device 120. In this manner, the leader radar device 110 and the follower radar device 120 use the same control signals to generate the high frequency radio signals (e.g., chirp signals) that are transmitted by antennas 112 and antennas 122 and to process received echo or reflection signals that are received by antennas 114 and antennas 124. In this way, leader radar device 110 and several follower radar devices (e.g., follower radar device 120) are cascaded coherently, which can increase the number of effective transmit and receive channels of the radar system, thereby enabling an increase in radar system sensor accuracy and resolution.

Each leader radar device 110 and follower radar device 120 implements several receiver and transmitter channels, and a digit unit or controller 160 that may operate as a digital controller, or may be implemented by a digital processor configured to combine data from all receivers, as well as to control and program the leader radar device 110 and follower radar device 120. The leader radar device 110 is arranged to distribute an LO signal 140 off-chip through transmission lines on a substrate (e.g., printed circuit board (PCB)) to which the components of depicted automotive radar system 100 are mounted to other system components (in this case the one other follower radar device 120).

LO signal 140 is used by the various transmitters and receivers of leader radar device 110 and follower radar device 120 to control the operations of the signal downconverters that process received signals. Signal 140 is typically star-routed (i.e., routed via transmission lines having equal length) to each radar device (e.g., leader radar device 110 and follower radar device 120) to provide the same delay and precise phase coherence of the LO signal 140 as it is distributed between all such radar devices. The follower radar device 120 (and further follower radar devices 123, if present) contains a second set of transmitter circuits coupled to transmit antennas 122 and a second set of receiver circuits coupled to receive antennas 124.

The distribution of the LO signal 140 from the leader radar device 110 provides that the follower radar device 120 is able to use the LO signal 140 generated by the leader radar device 110, and thereby ensure that the transmitting signal frequency and the LO frequency of the down conversion mixer (in RX blocks) of different radar ICs within leader radar device 110, follower radar device 120, and further follower radar devices 123, if present, are the same.

Typically, in cascade configuration, the LO signal 140 is routed with symmetrical PCB transmission line lengths in order to ensure that all receivers (encompassing a respective down mixer) in each leader radar device 110 and follower radar devices 120, 123 of depicted automotive radar system 100 receive the same LO signal with same phase. Other control signals may be synchronized with a lower speed clock, for example an analog-to-digital converter (ADC) clock, which may be used across multiple ICs/devices.

Leader radar device 110 is coupled to the digital unit 160. Digital unit 160 includes various interfaces, such as a serial-parallel interface (SPI) 162, a general-purpose data input-output port 170, and controller clock interface 164, this clock signal 165 generally provided by the leader radar device 110.

In a similar manner, a clock signal 142 is generated by leader radar device 110 and used as a time base for synchronization of the operations of leader radar device 110 and follower radar device 120 (and any other follower radar devices 123). The connection to the controller 160 consists of SPI control lines 163 and digital data line signals from leader radar device 110 and follower radar device 120 back to the controller 160 for later signal processing, in a given data format (e.g., Mobile Industry Processor Interface Camera Serial Interface (MIPI CSI-2), low voltage differential signaling (LVDS) or other formats).

The cascading clock signals transmitted between leader radar device 110 and follower radar device 120 are used for time-based synchronization of the sampling moments on the radar signal processing systems of the leader and follower radar devices. For optimal operation of distributed radar systems, it is important that these various control signals (LO signal 140 and clock signal 142) are synchronous across all receiver circuits on different radar devices.

Figure 2:
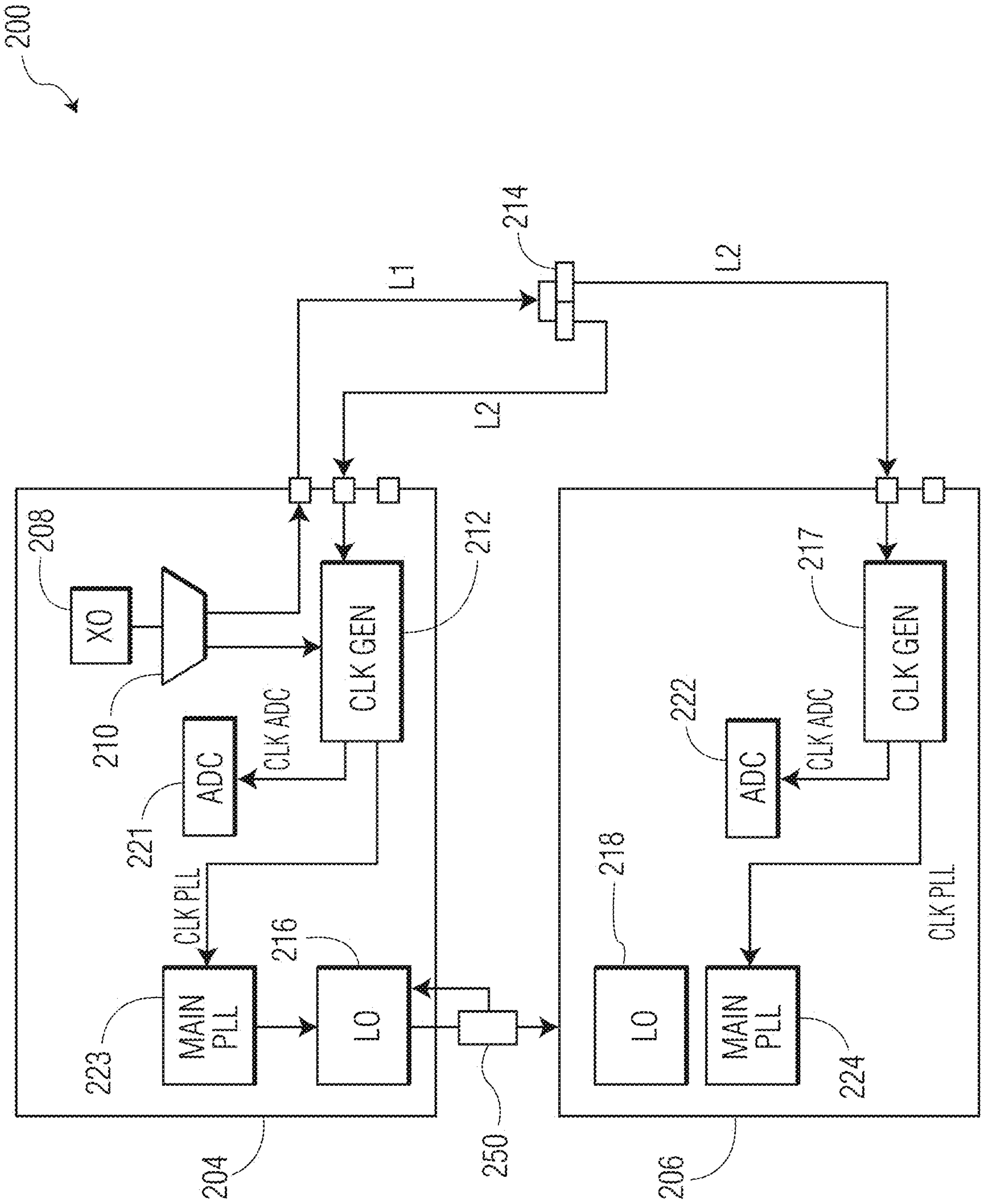
FIG. 2 is a block diagram of a cascaded radar topology in which a clock signal and local oscillator (LO) signal are distributed between a leader radar device and a follower radar device.

FIG. 2 is a simplified block diagram of a cascaded radar system 200 illustrating in more detail how control signals generated by a leader radar device 204 (e.g., leader radar device 110 of FIG. 1) are distributed to and thereby control the operation of a follower radar device 206 (e.g., follower radar device 120 of FIG. 1).

Leader radar device 204 includes crystal-controlled clock oscillator (XO) circuit 208. XO circuit 208 generates a signal at a desired frequency that is output by XO circuit 208 through a multiplexer (mux) 210 to both clock generation circuit 212 and external splitter 214.

External Splitter 214 splits the signal into two separate signals with the same frequency and equal phase and supplies a first one of the two signals back to clock generation circuit 212 via a first routing path and a second one of the two signals to clock generation circuit 217 of follower radar device 206 via a second routing path. In an embodiment of this disclosure, two signals having the same frequency and phase can mean that the frequency of the two signals and the phase of the two signals are each within 1% of each other. The two routing paths are of the same electrical length (i.e., the two paths are of the same length in terms of the phase shift introduced by transmission of a signal over the path at some frequency) to provide that the two signals reach clock generation circuit 212 and clock generation circuit 217 with the same delay and phase.

Clock generation circuit 212 of leader radar device 204 is configured to process the clock signal received directly from XO circuit 208 and the clock signal received from splitter 214 to generate clock signal inputs to various radar IC components such as ADC 221 and waveform generator PLL 223. Waveform generator PLL 223 supplies an input signal to LO circuit 216. From the modulated signal received from waveform generator PLL (modulated since frequency is varying over time, as the signal comprises a frequency-modulated continuous-wave (FMCW) chirp at waveform generator PLL 223 output) the LO circuit 216 generates a frequency varying reference LO signal that is transmitted to the LO circuit 218 of follower radar device 206 via splitter 250. Splitter 250 splits the LO signal receiver from leader radar device 204 into two separate signals with the same frequency and equal phase and supplies a first one of the two signals back to leader radar device 204 via a first routing path and a second one of the two signals to follower radar device 206 via a second routing path. The two routing paths are of the same electrical length (i.e., the two paths are of the same length in terms of the phase shift introduced by transmission of a signal over the path at some frequency) to provide that the two LO signals reach the leader radar device 204 and follower radar device 206 from splitter 250 with the same delay and phase.

The LO signals distributed to leader radar device 204 and leader radar device 204 via splitter 250 are used by both radar devices to generate the high frequency RF chirp signals that are ultimately transmitted by leader radar device 204 and follower radar device 206 as part of the operation of cascaded radar system 200. The LO signals are also used by receiver circuitry in each of leader radar device 204 and follower radar device 206 for processing and decoding of radar signals received by each of leader radar device 204 and follower radar device 206.

In the configuration depicted in FIG. 2, leader radar device 204 is solely responsible for generating the control signals that are ultimately used by both leader radar device 204 and follower radar device 206 to output RF chirp signals and to process reflections of those signals.

During operation, however, the chirp signals being generated are not useful for radar system operations at all times. The chirp signals, particularly during the early part of their waveform, exhibit significant transient effects (e.g., during a settling time of the chirp signals) that make those portions of the signals unsuited to radar operations. As such, signal processing executed on the received echoes of these transient portions of the chirp signals may not result in accurate object detection and generally represent wasted portions of the chirp signals. As such, radar signal processing generally involves ignoring these transient portions of the chirp signals and instead capturing and processing the reflection or echo signals that are associated with the non-transient portions of the chirp signals.

Figure 3:
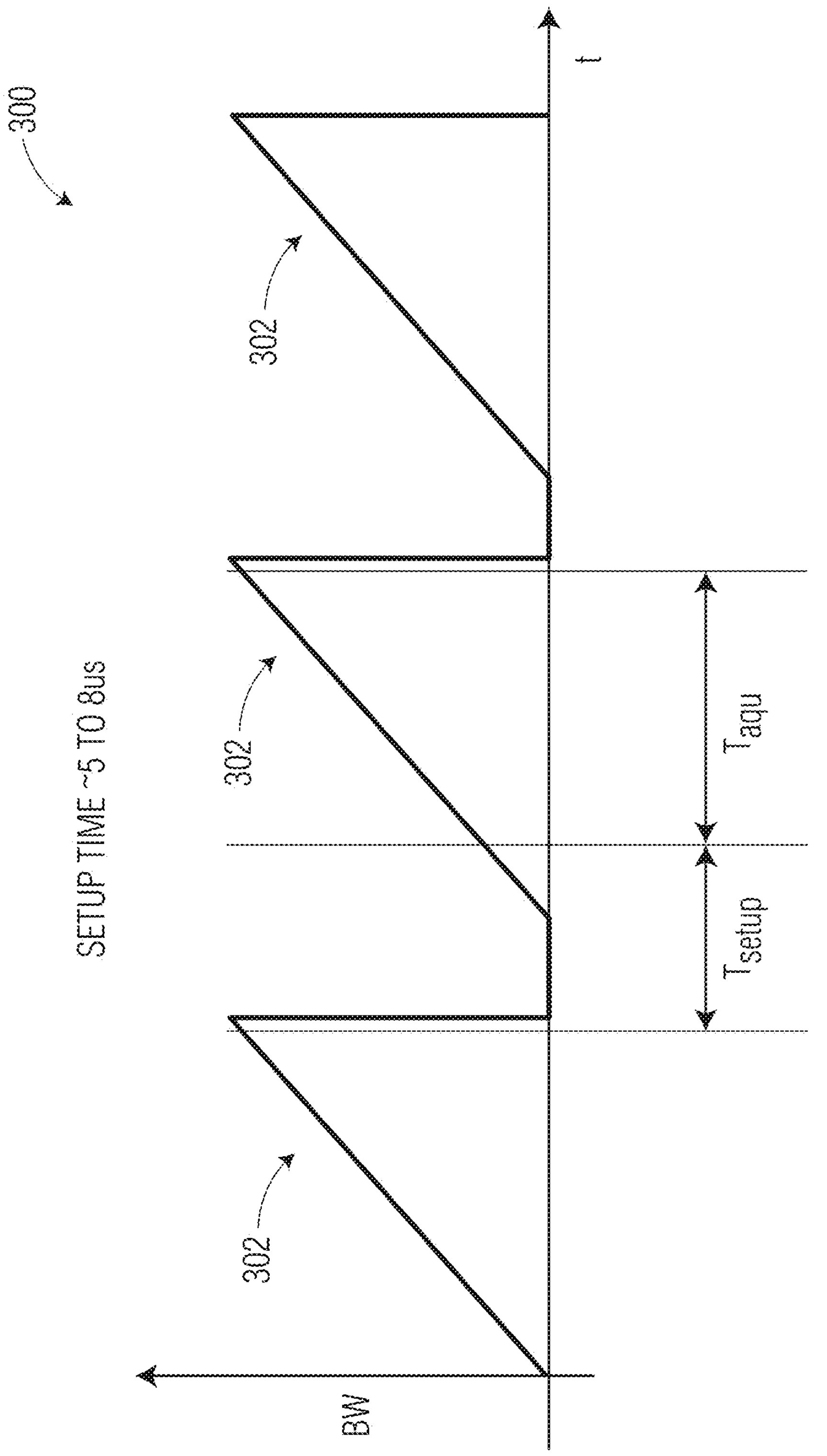
FIG. 3 is a chart depicting the waveform of a series of chirp signals generated by the leader radar device and the follower radar device of FIG. 2.

To illustrate, FIG. 3 is a chart depicting the waveform of a series of chirp signals that may be generated by leader radar device 204 or follower radar device 206 of FIG. 2 using the LO signal distributed by leader radar device 204. In the chart, the vertical axis represents the frequency magnitude of the chirp signals, while the horizontal axis represents time. As depicted, within each chirp signal 302, there is a region $T_{setup}$ of the chirp signal 302 in which significant transient signals are present. This portion $T_{setup}$ of each chirp signal 302 generally represents an unusable portion of the chirp signal 302 or, at least a portion that, if the reflection signals associated with that portion are processed, does not generate the most accurate object attribute estimation. The transient signals are generated by the analog PLL that is used to generate a frequency ramp. By changing the division ratio inside the PLL a signals with varying output frequency can be generated. However, such PLLs contain filters that can exhibit transient effects. Therefore, a perfectly linear frequency ramp may not be achieved by a real-world PLL. Instead, an output signal that exhibits an exponentially decaying transient is observed. In contrast to the $T_{setup}$ regions of the output signal, regions $T_{acq}$ (i.e., $T_{acquisition}$) of the chirp signals 302 represent the portions of the chirp signal 302 that do not include transient signal and may be used for normal radar signal processing operations.

To improve radar system efficiency and reduce the potential loss of information due to the portions (i.e., $T_{setup}$) of chirp signals that are generally unusable, the present disclosure provides a radar system implementation in which both a radar system leader device and follower device are used to independently generate the LO signals used to generate chirp signals. The LO signals generated by the leader and follower devices are interleaved to generate an output signal that includes an interleaved LO signal in which even chirps in the interleaved LO signal come from the LO signal generated by the leader device, while odd numbered chirps in the interleave LO signalcome from the LO signals generated by the follower device. The various signals that make up the interleaved LO signal are somewhat overlapped so that only the non-setup (i.e., non-transient) portions of the LO signals generated by the leader and follower devices are used to create the interleaved LO signal.

The interleaved LO signal is then distributed to both the leader and follower devices, which, in turn, use the interleaved LO signal to generate transmitted chirp signals and to process received radar signals. As described herein, in this configuration, the chirp signals being generated by both the leader and follower devices are effectively overlapped such that the resulting chirp signals are generated only using the non-setup (i.e., the non-transient) portions of the LO signals generated by the leader and follower devices. By overlapping the chirp signals in this manner, inefficiencies resulting from the LO signal setup time can be mitigated. In some embodiments, as described herein, the signals may be further overlapped to account for other delays in the signal processing chain, including time-of-flight delays, and signal windowing and signal filtering processes.

Specifically, by alternating the source of LO signals used to generated leader and follower device chirp signals, an effective chirp signal modulation scheme can be implemented by leader and follower devices with minimized (or in some cases, zero) setup time. As such, chirp signals with minimized setup times can be achieved using the available PLLs in both the leader and follower devices to continuously generate LO signals, where a control switches back and forth between the leader and follower device as to which device is generating the LO signal actively being used to generate corresponding chirp signals.

Figure 4A:
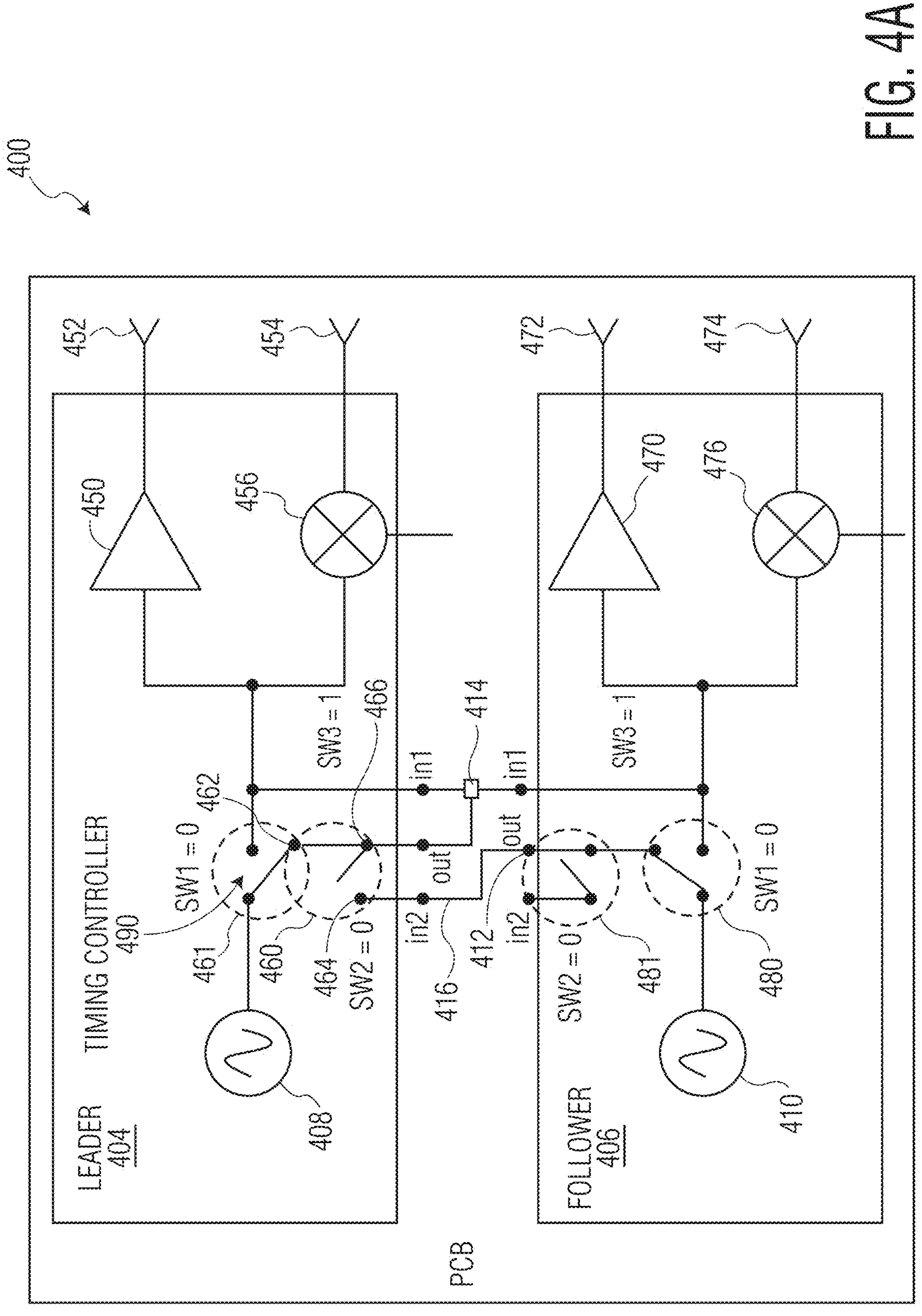
FIGS. 4A and 4B are simplified block diagrams of a leader device and a follower device of a radar system in which LO signals generated by both a leader radar device and a follower radar device are used to generate alternating chirp signals for the cascaded radar system.
Figure 4B:
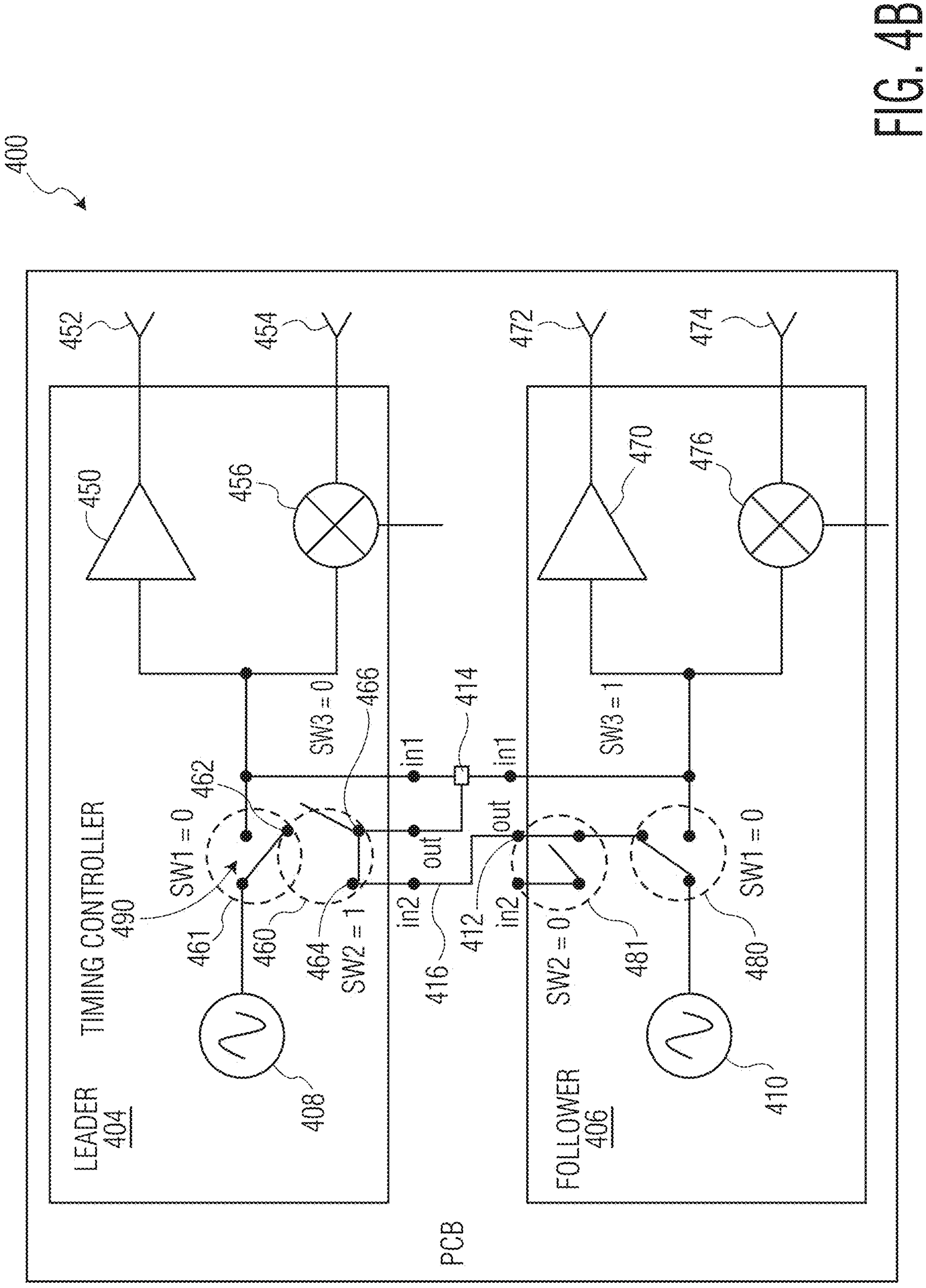

In accordance with the present disclosure, FIGS. 4A and 4B are simplified block diagrams of radar system 400 in which LO signals generated by both a leader radar device 404 and a follower radar device 406 are used in an alternating scheme to generate chirp signals for the cascaded radar system 400.

In cascaded radar system 400, both leader radar device 404 and follower radar device 406 are configured similarly such that both devices generally include the same or similar components with similar internal circuitry and components and well as the same or similar output/input pin configurations.

In cascaded radar system 400, leader radar device 404 includes an LO signal generator 408. LO signal generator 408 is configured to receive clock signals (e.g., from components such as XO circuit 208 and clock generation circuit 212 of FIG. 2) and process those signals to generate output LO signals. As described herein, the LO signals are utilized by leader radar device 404 to construct and transmit high frequency radar chirp signals from transmitter 450 and transmit antenna 452. Additionally, the LO signals are used to process and decode RF signals received via receive antenna 454 via receiver 456.

As described herein, the LO signal generated by LO signal generator 408 can be distributed to follower radar device 406 to enable follower radar device 406 to transmit and receive RF radar chirp signals in a manner that is time-synchronized with follower radar device 406.

The LO signal generated by LO signal generator 408 passes through switch 461 to terminal 462 of switch 460. During operation of cascaded radar system 400, switch 461 is maintained in the configuration in which LO signal generator 408 is connected to terminal 462. If, in some other application, leader radar device 404 were to be operated as a stand-alone device, the configuration of switch 461 can be changed into a stand-alone device in which the LO signal generated by LO signal generator 408 is transmitted directed to transmitter 450 and receiver 456 of leader radar device 404. Accordingly, in the present disclosure, switch 461 is optional and can be replaced by a direct connection between the output of LO signal generator 408 and terminal 462 of switch 461.

In accordance with the present disclosure, to enable distribution of the LO signal generated by LO signal generator 408, leader radar device 404 includes switch 460 which includes input terminals 462, 464, and 466. In a first configuration of switch 460, terminal 462 is connected to terminal 466 and terminal 464 is disconnected. In a second configuration of switch 460, terminal 464 is connected to terminal 466 and terminal 462 is disconnected.

When switch 460 is in its first position connecting terminal 462 to terminal 466, the LO signal generated by LO signal generator 408 is transmitted to external splitter 414. In an embodiment, external splitter 414 includes a signal splitter that is external to the two internal circuits (ICs) that contain leader radar device 404 and follower radar device 406.

External splitter 414 splits the signal received at its input terminal into two separate signals with the same frequency and equal phase and supplies a first one of the two signals back to leader radar device 404 via a first routing path and a second one of the two signals to follower radar device 406 via a second routing path. The two routing paths are of the same electrical length (i.e., the two paths are of the same length in terms of the phase shift introduced by transmission of a signal over the path at some frequency) to provide that the two signals reach the signal processing components of leader radar device 404 and follower radar device 406 with the same delay and phase.

Via external splitter 414, leader radar device 404 receives the LO signal which is provided to transmitter 450 and receiver 456 for RF signal processing.

Similarly, with switch 460 in its first condition the LO signal received from LO signal generator 408 of leader radar device 404 is transmitted through external splitter 414 and, via the second routing path, to the transmitter 470 and receiver 476 of follower radar device 406. Transmitter 470 uses the LO signals to generate high frequency RF signals that are transmitted through transmit antenna 472. Similarly, the LO signals are used by receiver 476 process received RF signals received through receive antenna 474.

In this configuration, therefore, with switch 460 in its first configuration that connects terminal 462 to terminal 466, leader radar device 404 is responsible for distributing its LO signal to follower radar device 406.

Alternatively, however, follower radar device 406 may instead be responsible for generating and distributing the LO signal back to leader radar device 404. As such, follower radar device 406 includes an LO signal generator 410. LO signal generator 410 is configured to receive clock signals (e.g., from components such as an XO circuit and clock generation circuit) and process those signals to generate output LO signals. As described herein, the LO signals are utilized by follower radar device 406 to construct and transmit high frequency radar chirp signals from transmitter 470 and transmit antenna 472. Additionally, the LO signals are used to process and decode RF signals received via receive antenna 474 via receiver 476.

As described herein, the LO signal generated by LO signal generator 410 of follower radar device 406 can be distributed back to leader radar device 404 to enable leader radar device 404 to transmit and receive RF radar signals in a manner that is synchronized with follower radar device 406.

To enable distribution of that LO signal, LO signal generator 410 of follower radar device 406 is connected to output pin 412 of follower radar device 406 through switches 480 and 481. During operation of cascaded radar system 400, switches 480 and 481 are maintained in the depicted configuration in which LO signal generator 410 is connected to output pin 412. If, however, follower radar device 406 were to be incorporated into other radar devices, switches 480 and 481 could enable follower radar device 406 to operate as a standalone radar device, or, in some circumstances, as a leader radar device in another radar system. Switches 480 and 481 and therefore depicted to illustrate how leader radar device 404 and follower radar device 406 may have the same configuration (e.g., the same configuration of components and switches), however with the various switches configured as shown, radar system 400 can be realized.

Regarding follower radar device 406, output pin 412 is connected, via connection 416 (e.g., a conductive trace on a PCB containing both leader radar device 404 and follower radar device 406) to terminal 464 of switch 460.

To enable follower radar device 406 to deliver the LO signal from LO signal generator 410 into leader radar device 404, switch 460 is set to its second configuration in which terminal 464 is connected to terminal 464 (this switch configuration is illustrated in FIG. 4B).

With switch 460 so configured, LO signal generator 408 is disconnected and the LO signal generated by LO signal generator 410 of follower radar device 406 is transmitted through connection 416, through switch 460 and into external splitter 414. External splitter 414 splits the signal received at its input terminal (in this mode, the signal received from LO signal generator 410 of follower radar device 406) into two separate signals with the same frequency and equal phase and supplies a first one of the two signals back to leader radar device 404 via a first routing path and a second one of the two signals back to follower radar device 406 via a second routing path. Via external splitter 414, leader radar device 404 receives the LO signal from follower radar device 406 which is provided to transmitter 450 and receiver 456 for RF signal processing. Similarly, via external splitter 414, follower radar device 406 receives back the LO signal which is provided to the transmitter 470 and receiver 476 of follower radar device 406. Transmitter 470 uses the LO signals to generate high frequency RF chirp signals that are transmitted through transmit antenna 472 and to process received RF signals received through receive antenna 474.

To summarize, cascaded radar system 400 has two modes of operation. In the first mode (i.e., with switch 460 in its first configuration), LO signals generated by LO signal generator 408 of leader radar device 404 are used to control the operation of leader radar device 404 and follower radar device 406. In the second mode of operation (i.e., with switch 460 in its second configuration), LO signals generated by LO signal generator 410 of follower radar device 406 are used to control the operation of leader radar device 404 and follower radar device 406. The mode of operation is controlled by changing the configuration of switch 460 of leader radar device 404.

Within radar device 400, therefore, a timing controller 490 is connected to switch 460 of leader radar device 404. According to a predefined timing algorithm, timing controller 490 is configured to toggle switch 460 between its two configurations to determine whether the LO signal generated by leader radar device 404 or follower radar device 406 is being actively routed to the transceivers (e.g., transmitter 450 and receiver 456 of leader radar device 404 and transmitter 470 and receiver 476 of follower radar device 406) of the radar system 400.

In various embodiments of cascaded radar system 400, the various signal path length s between leader radar device 404 and follower radar device 406 should be minimized (e.g., less than around 2 centimeters and, typically, less than 4 centimeters. If the signal paths are too long, particularly the connection 416 path between terminal 464 of switch 460 and output pin 412 of follower radar device 406, any signal delay may be compensated for by adjusting the center frequency of the chirps being generated by either leader radar device 404 or follower radar device 406.

Specifically, because the LO signals generated by follower radar device 406 and traveling along connection 416 between terminal 464 of switch 460 and output pin 412 may be delayed with respect to the LO signals being generated and distributed by leader radar device 404, which do not have to travel along connection 416, a small center frequency offset between leader and follower devices may be utilized to compensate by shifting the center frequency of the LO signals being generated by one of leader radar device 404 and follower radar device 406.

Where connection 416 has a length of around 2 centimeters, for example, signals travelling along the path of connection 416 may be delayed by about 10 nanoseconds (ns), which leads to, for example, an 80 kilohertz (kHz) frequency offset for a 4 gigahertz (GHz), 50 microsecond (us) long chirp signal. This compensation can result in a small center frequency offset between leader and follower devices. This frequency offset can be compensated on one or both sides for example by shifting the center frequency of one of leader radar device 404 and follower radar device 406 accordingly.

In the radar system 400 configuration illustrated in FIGS. 4A and 4B, both leader radar device 404 and follower radar device 406 have very similar component configurations, having essentially the same LO signal generation circuitry and receiver/transmitter configuration. The presence of switch 460 in leader radar device 404 enables the operation of cascaded radar system 400 in a manner in which leader radar device 404 and follower radar device 406 can alternate responsibility for generating the controlling LO signals. In various embodiments, a similarly configured switch may be present within follower radar device 406. In that case, both leader radar device 404 and follower radar device 406 may have identical component configurations, but in the follower radar device 406 the switch would be biased to always connect LO signal generator 410 of follower radar device 406 to output pin 412.

During normal system operations, timing controller 490 (e.g., a microprocessor or other controller chip) is configured to toggle the configuration of switch 460 between the first and second configurations at a frequency such that LO signals from leader radar device 404 and follower radar device 406 are alternatingly transmitted to the receiver/transmitter components of leader radar device 404 and follower radar device 406. By alternating the source of the LO signals, power consumption between leader radar device 404 and follower radar device 406 are balanced, resulting in more even power dissipation and consistent thermal attributes of the two devices. This may be beneficial to the operation of cascaded radar system 400 in that it can provide improved signal stability.

In other embodiments, leader radar device 404 and follower radar device 406 may be connected in different configurations to alternatingly distribute the LO signals generated by leader radar device 404 and follower radar device 406 between devices. For example, leader radar device 404 and follower radar device 406 may be connected by a second star network that could be connected between leader radar device 404 and follower radar device 406 to generate a similar LO signal routing capability.

Figure 5:
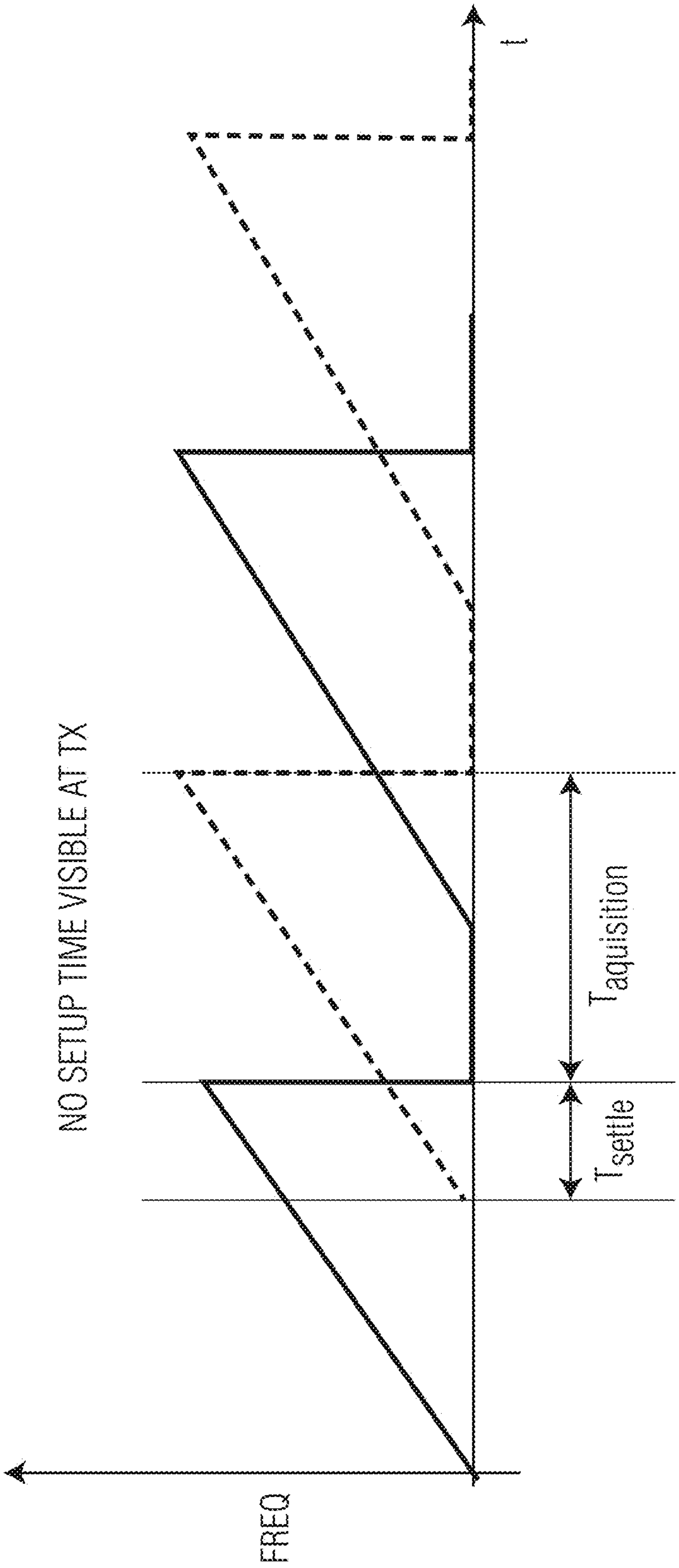
FIG. 5 is a chart depicting the alternating chirp signals that may be generated by a radar system using LO signals that are alternately provided by leader radar device and follower radar device of FIGS. 4A and 4B.

FIG. 5 is a chart depicting the alternating chirp signals that may be generated by radar system 400 using LO signals that are alternately provided by leader radar device 404 and follower radar device 406 to account for chirp signal setup time.

The present approach for toggling responsibility for generating LO signals used for radar signal transmissions and receptions to minimize wasted time due to chirp signal setup time can be extended to further minimize other delays in the radar signal processing process. For example, in radar systems utilizing RF signals encoded using time division multiple access (TDMA) encoding, delays due to RF signal time-of-flight (i.e., the time required for the radar signal to be transmitted, travel to an object, be reflected by the object, and travel back to the radar system in the form of a reflected signal) can represent unnecessary delays in the signal processing chain. Specifically, the chirp signals used by such radar systems must be offset from one another to account for the round trip delay. Using the present system, therefore, the chirp signals used in a TDMA radar system can be compressed along the time dimension to account for time of flight delays.

Figure 6:
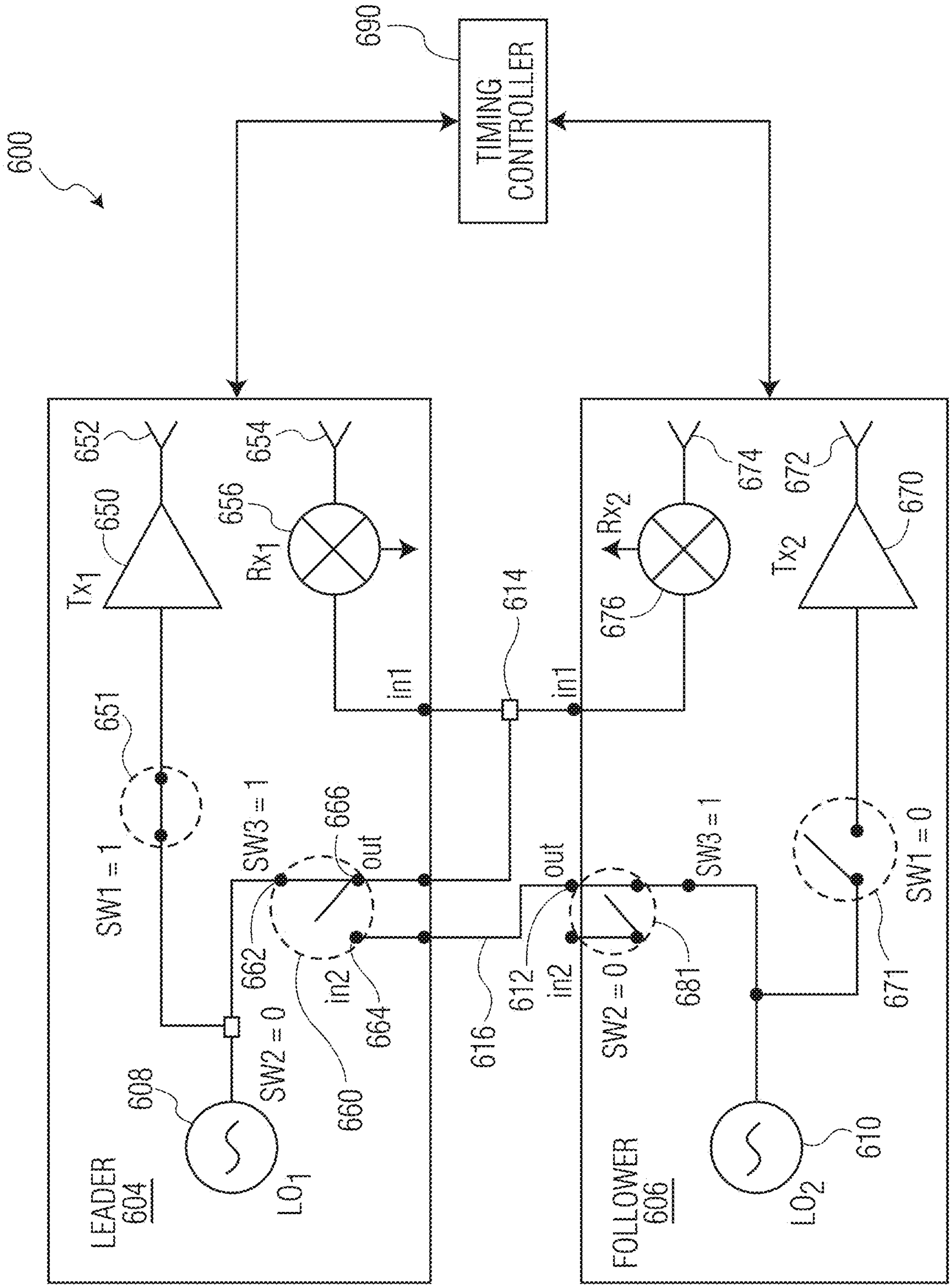
FIG. 6 is a simplified block diagram of another embodiment of a leader device and a follower device of a radar system in which LO signals generated by both a leader radar device and a follower radar device are used to generate alternating chirp signals for the cascaded radar system.

FIG. 6 is a block diagram depicting a radar device 600 in which LO signals generated by both a leader radar device 604 and a follower radar device 606 are, according to a predetermined switching sequence, used to transmit and receive radar signals. In cascaded radar system 600, both leader radar device 604 and follower radar device 606 are configured similarly such that both devices generally include the same or similar components with similar internal circuitry and components and well as the same or similar output/input pin configurations enabling their use as either leader or follower devices in a radar system.

In cascaded radar system 600, leader radar device 604 includes an LO signal generator 608. LO signal generator 608 is configured to receive clock signals (e.g., from components such as XO circuit 208 and clock generation circuit 212 of FIG. 2) and process those signals to generate output LO signals. As described herein, the LO signals are utilized by leader radar device 604 to construct and transmit high frequency radar chirp signals from transmitter 650 and transmit antenna 652. Additionally, the LO signals generated by LO signal generator 608 can, as described herein, be used to process and decode RF signals received via receive antenna 654 via receiver 656. LO signal generator 608 is connected to transmitter 650 through switch 651.

As described herein, the LO signal generated by LO signal generator 608 can be distributed to follower radar device 606 to enable follower radar device 606 to transmit and receive RF radar chirp signals in a manner that is time-synchronized with leader radar device 604.

The LO signal generated by LO signal generator 608 is supplied to terminal 662 of switch 660. Switch 660 includes input terminals 662, 664, and 666. In a first configuration of switch 660, terminal 662 is connected to terminal 666 and terminal 664 is disconnected. In a second configuration of switch 660, terminal 664 is connected to terminal 466 and terminal 662 is disconnected.

When switch 660 is in its first position connecting terminal 662 to terminal 666, the LO signal generated by LO signal generator 608 is transmitted to external splitter 614. In an embodiment, external splitter 614 includes a signal splitter that is external to the two internal circuits (ICs) that contain leader radar device 604 and follower radar device 606.

External splitter 614 splits the signal received at its input terminal into two separate signals with the same frequency and equal phase and supplies a first one of the two signals back to leader radar device 604 via a first routing path and a second one of the two signals to follower radar device 606 via a second routing path. The two routing paths are of the same electrical length (i.e., the two paths are of the same length in terms of the phase shift introduced by transmission of a signal over the path at some frequency) to provide that the two signals reach the signal processing components of leader radar device 604 and follower radar device 606 with the same delay and phase.

Via external splitter 614, leader radar device 604 receives the LO signal which is provided to receiver 656 for RF signal processing.

Similarly, with switch 660 in its first condition the LO signal received from LO signal generator 608 of leader radar device 404 is transmitted through external splitter 614 and, via the second routing path, to the receiver 676 of follower radar device 606. The received LO signals are used by receiver 676 to process received RF signals received through receive antenna 674.

In this configuration, therefore, with switch 660 in its first configuration that connects terminal 662 to terminal 666, leader radar device 604 is responsible for distributing the LO signal generated by LO signal generator 608 to follower radar device 606.

Alternatively, however, follower radar device 606 may instead be responsible for generating and distributing the LO signal back to leader radar device 604. As such, follower radar device 606 includes an LO signal generator 610. LO signal generator 610 is configured to receive clock signals (e.g., from components such as an XO circuit and clock generation circuit) and process those signals to generate output LO signals. As described herein, the LO signals are utilized by follower radar device 606 to construct and transmit high frequency radar chirp signals from transmitter 670 and transmit antenna 672. LO signal generator 610 is connected to transmitter 670 through switch 671.

As described herein, the LO signal generated by LO signal generator 610 of follower radar device 606 can be distributed back to leader radar device 604 to enable leader radar device 604 to transmit and receive RF radar signals in a manner that is synchronized with follower radar device 606.

To enable distribution of that LO signal, LO signal generator 610 of follower radar device 606 is connected to output pin 612 of follower radar device 606 through switch 681. In follower radar device 606, output pin 612 is connected, via connection 616 (e.g., a conductive trace on a PCB containing both leader radar device 604 and follower radar device 606) to terminal 664 of switch 660.

To enable follower radar device 606 to deliver the LO signal from LO signal generator 610 into leader radar device 604, switch 660 is set to its second configuration in which terminal 664 is connected to terminal 664. With switch 660 so configured, the LO signal generated by LO signal generator 610 of follower radar device 606 is transmitted through connection 616, through switch 660 and into external splitter 614. External splitter 614 splits the signal received at its input terminal (in this mode, the signal received from LO signal generator 610 of follower radar device 606) into two separate signals with the same frequency and equal phase and supplies a first one of the two signals back to leader radar device 604 via a first routing path and a second one of the two signals back to follower radar device 606 via a second routing path. Via external splitter 614, leader radar device 604 receives the LO signal from follower radar device 606 which is provided to receiver 656 for RF signal processing. Similarly, via external splitter 614, follower radar device 606 receives back the LO signal which is provided to the receiver 676 of follower radar device 606.

Within radar device 600, a timing controller 690 is connected to leader radar device 604 and follower radar device 606. Timing controller 690 is configured to, as described below, control a configuration of switch 651, switch 660, switch 681, and 671.

Figure 7:
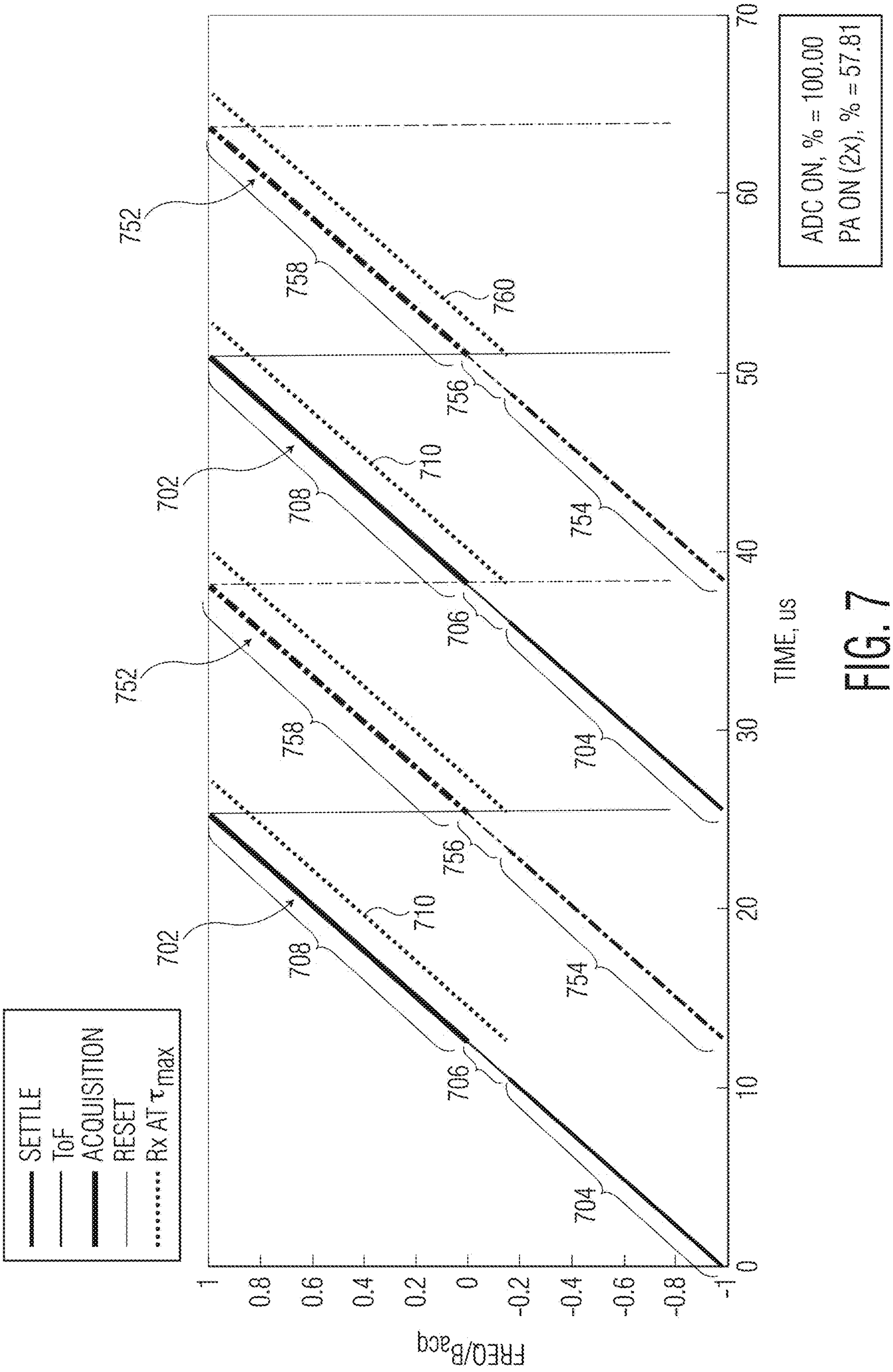
FIG. 7 is a chart depicting the alternating chirp signals that may be generated by the radar system of FIG. 6 using LO signals that are alternately provided by a leader radar device and a follower radar device.

FIG. 7 is a chart depicting the timing sequence of chirp signals and received signal processing for radar system 600 of FIG. 6 to generate overlapping chirp signals that compensate for time of flight signal delays. In FIG. 7, the horizontal axis represents time while the vertical axis represents signal frequency magnitude, which is expressed as signal frequency (Freq) over baseband frequency ($B_{acq}$).

In FIG. 7, chirp signals 702 represent chirp signals generated using the LO signal distributed by leader radar device 604 and chirp signals 752 represent chirp signals generated using an LO signal distributed by follower radar device 606.

Chirp signals 702 generated using LO signals output by the leader device include a first portion 704 that represents the portion of the chirp signal that includes transient signals (i.e., Tsetup). A second portion 706 of the chirp signals 702 represents the time of flight delay of the beginning of the usable portion of the chirp signal 702. Portion 704 generally represents an unused portion of chirp signal 702. Portion 706 represents a portion of chirp signal 702 that is included in the transmitted chirp signal 702. Specifically, portion 706 is the portion of the transmitted signal that must travel the round trip from transmitter antenna to an object back to the receiver antenna before a reflection signal is received by the radar system. As such, portion 706 represents the time-of-flight of the transmitted signal. The third portion 708 of chirp signals 702 represents the portion of the chirp signals 702 that can be utilized for processing received signals 710 following the time of flight delay. Accordingly, during the second portion 706 and third portion 708 of chirp signals 702 the cascaded radar system 600 transmitter for leader radar device 604 is operative and switch 651 is closed. Otherwise, switch 651 is open such that the LO signal of leader radar device 604 is not used to transmit signals.

Similarly, chirp signals 752 generated using LO signals output by the follower device include a first portion 754 that represents the portion of the chirp signal that includes transient signals (i.e., Tsetup). A second portion 756 of the chirp signals 752 represents the time of flight delay of the beginning of the usable portion of the chirp signal 752. Portion 754 generally represents an unusable portion of chirp signal 752. Portion 756 represents a portion of chirp signal 752 that is included in the transmitted chirp signal 752. Specifically, portion 756 is the portion of the transmitted signal that must travel the round trip from transmitter antenna to an object back to the receiver antenna before a reflection signal is received by the radar system. As such, portion 756 represents the time-of-flight of the transmitted signal. The third portion 758 of chirp signals 752 represents the portion of the chirp signals 752 that can be utilized for processing received signals 760 following the time of flight delay. Accordingly, during the second portion 756 and third portion 758 of chirp signals 752 the cascaded radar system 600 transmitter for follower radar device 606 is operative and switch 671 is closed. Otherwise, switch 671 is open such that transmitter 670 of follower radar device 606 is otherwise non-operative.

In some embodiments, the timing schedule used to control the operation of switch 660 of leader device 604 of radar system 600 can be further configured to account for other delays in the processing of received radar signals such as by accounting for WINDOW and FFT delays in signal processing. Specifically, during WINDOWs processing, the first and last samples in a signal acquisition window are weighted with very low numbers making those samples less relevant in the overall system performance. In that case, the timing schedule can be further compressed in accordance with the present disclosure to account for portions of signals during setup time and WINDOW processing.

On the reception side, signals 710 represent reflections of portions 706 and 708 of the transmitted chirp signals 702 that were generated based on the leader device LO signal. During the reception of signals 710, therefore, switch 660 is set in its first configuration in which the LO signal generated by leader radar device 604 is distributed to the radar system's radar receivers (e.g., receiver 656 of leader radar device 604 and receiver 676 of follower radar device 606) to process the received signals 710. Consequently, switch 660 is set to its first configuration during the time period that begins at the beginning of third portion 708 of chirp signals 702 (i.e., when the reflection signal 760 is first received) and ends at a time period equal to the end of the transmission of third portion 708 of chirp signals 702 plus a delay to account for time-of flight. Conversely, signals 760 represent reflections of the transmitted chirp signals 752 that were generated based on the follower device LO signal. During the reception of signals 760, therefore, switch 660 is set in its second configuration in which the LO signal generated by follower radar device 606 is distributed to the radar system's radar receivers (e.g., receiver 656 of leader radar device 604 and receiver 676 of follower radar device 606) to process the received signals 760. Consequently, switch 660 is set to its second configuration during the time period that begins at the beginning of third portion 758 of chirp signals 752 and ends at a time period equal to the end of the transmission of third portion 758 of chirp signals 752 plus a delay to account for time-of flight.

According to the timing diagram of FIG. 7, therefore, radar system 600 can be operated such that the transmitters in the leader radar device 604 and follower radar device 606 are only operational and transmitting through their respective transmitter antennas during the usable portions of their respective chirp signals. In a similar manner (but offset in time to account for time-of-flight delays) the receivers in the leader and follower devices are configured to use either the leader LO signal or the follower LO signal to process the time-offset received reflection signals In some aspects, the techniques described herein relate to an automotive radar system, including: a leader radar device, including: a first local oscillator signal generator configured to generate a first local oscillator signal, and a first transmitter and a first receiver configured to transmit and receive first radar signals, respectively; a follower radar device, including: a second local oscillator signal generator configured to generate a second local oscillator signal, and a second transmitter and a second receiver configured to transmit and receive second radar signals, respectively; and a controller configured to selectively configure the leader radar device to transmit the first local oscillator signal to the follower radar device and selectively configure the follower radar device to transmit the second local oscillator signal to the leader radar device.

In some aspects, the techniques described herein relate to an automotive radar system, wherein the first transmitter and receiver are configured to use the second local oscillator signal to transmit and receive the first radar signals and the second transmitter and receiver are configured to use the first local oscillator signal to transmit and receive the second radar signals.

In some aspects, the techniques described herein relate to an automotive radar system, further including a switch having a first terminal connected to the first local oscillator signal generator, a second terminal, and a third terminal connected to an input terminal of a signal splitter, wherein the signal splitter is configured to output a first signal to the first transmitter and receiver and a second signal to the second transmitter and receiver based on an input signal received at the input terminal of the signal splitter, wherein the first signal and the second signal have the same frequency and phase.

In some aspects, the techniques described herein relate to an automotive radar system, wherein the second local oscillator signal generator is connected to the second terminal of the switch, and further including wherein the controller is configured to modify a configuration of the switch.

In some aspects, the techniques described herein relate to an automotive radar system, wherein the controller is configured to toggle the switch to interleave the first local oscillator signal and the second local oscillator signal at the input terminal of the signal splitter.

In some aspects, the techniques described herein relate to an automotive radar system, wherein: the follower radar device includes an output pin and the second local oscillator signal generator is connected to the output pin; the leader device includes an input pin connected to the second terminal of the switch; and the output pin is electrically connected to the input pin.

In some aspects, the techniques described herein relate to an automotive radar system, wherein the electrical connection includes a conductive trace and a length of the conductive trace is less than four centimeters.

In some aspects, the techniques described herein relate to an automotive radar system, further including a second switch connected between the first local oscillator signal generator and the first transmitter.

In some aspects, the techniques described herein relate to an automotive radar system, wherein the controller is configured to modify a configuration of the second switch to cause the first local oscillator signal to be provided to the first transmitter.

In some aspects, the techniques described herein relate to an automotive radar system, including: a signal splitter; a leader radar device, including: a first local oscillator signal generator including a first phase locked loop circuit configured to generate a first local oscillator signal using a first clock signal, a switch having a first terminal connected to the first local oscillator signal generator, a second terminal, and a third terminal connected to an input terminal of the signal splitter, and a first transmitter and a first receiver configured to transmit and receive first radar signals, respectively; a follower radar device, including: a second local oscillator signal generator including a second phase locked loop circuit configured to generate a second local oscillator signal, wherein the second terminal of the switch is connected to the second local oscillator signal generator, and a second transmitter and a second receiver configured to transmit and receive second radar signals, respectively, wherein the signal splitter is configured to output a first signal to the first transmitter and receiver and a second signal to the second transmitter and receiver based on an input signal received at the input terminal of the signal splitter, wherein the first signal and the second signal have the same magnitude and phase; and a controller configured to selectively put the switch in at least one of a first configuration in which the first terminal is connected to the third terminal and a second configuration in which the second terminal is connected to the third terminal.

In some aspects, the techniques described herein relate to an automotive radar system, wherein the controller is configured to modify a configuration of the switch to alternate between the first local oscillator signal being supplied to the input terminal of the signal splitter and the second local oscillator signal being supplied to the input terminal of the signal splitter.

In some aspects, the techniques described herein relate to an automotive radar system, wherein the controller is configured to toggle the switch to interleave the first local oscillator signal and the second local oscillator signal at the input terminal of the signal splitter.

In some aspects, the techniques described herein relate to an automotive radar system, wherein: the follower radar device includes an output pin and the second local oscillator signal generator is connected to the output pin; the leader device includes an input pin connected to the second terminal of the switch; and an electrical connection is formed between the output pin and the input pin.

In some aspects, the techniques described herein relate to an automotive radar system, wherein the electrical connection includes a conductive trace and a length of the conductive trace is less than four centimeters.

In some aspects, the techniques described herein relate to an automotive radar system, further including a second switch connected between the first local oscillator signal generator and the first transmitter.

In some aspects, the techniques described herein relate to an automotive radar system, wherein the controller is configured to modify a configuration of the second switch to determine whether the first local oscillator signal is provided to the first transmitter.

In some aspects, the techniques described herein relate to an automotive radar system, wherein the leader radar device is implemented within a first integrated circuit and the follower radar device is implemented within a second integrated circuit.

In some aspects, the techniques described herein relate to a radar device, including: a first local oscillator signal generator including a first phase locked loop circuit configured to generate a first local oscillator signal using a clock signal; a switch having a first terminal connected to the first local oscillator signal generator, a second terminal, and a third terminal configured to connect to an input terminal of a signal splitter, wherein the second terminal is configured to connect to a second radar device to receive a second local oscillator signal; and first transmitters and receivers configured to transmit and receive first radar signals using the first local oscillator signal and/or the second local oscillator signal.

In some aspects, the techniques described herein relate to a radar device, wherein the second radar device is a follower radar device including a second local oscillator signal generator including a second phase locked loop circuit configured to generate the second local oscillator signal using a clock signal.

In some aspects, the techniques described herein relate to a radar device, wherein the switch is configured to be controlled by a controller that is configured to toggle the switch to interleave the first local oscillator signal and the second local oscillator signal at the input terminal of the signal splitter. Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive radar system, comprising:

a signal splitter;

a leader radar device, including:

- a first local oscillator signal generator configured to generate a first local oscillator signal,
- a first transmitter and a first receiver configured to transmit and receive first radar signals, respectively; and
- a switch having a first terminal connected to the first local oscillator signal generator, a second terminal, and a third terminal connected to an input terminal of the signal splitter;

a follower radar device, including:

a second local oscillator signal generator configured to generate a second local oscillator signal, and a second transmitter and a second receiver configured to transmit and receive second radar signals, respectively, wherein the signal splitter is configured to output a first signal to the first transmitter and receiver along a first path and a second signal to the second transmitter and receiver along a second path based on an input signal received at the input terminal of the signal splitter, wherein the first path and the second path have equal lengths, and wherein the first signal and the second signal have the same frequency and phase; and a controller configured to selectively configure the leader radar device to transmit the first local oscillator signal to the follower radar device and selectively configure the follower radar device to transmit the second local oscillator signal to the leader radar device.

2. The automotive radar system of claim 1, wherein the first transmitter and receiver are configured to use the second local oscillator signal to transmit and receive the first radar signals and the second transmitter and receiver are configured to use the first local oscillator signal to transmit and receive the second radar signals.

3. The automotive radar system of claim 1, wherein the second local oscillator signal generator is connected to the second terminal of the switch, and further comprising wherein the controller is configured to modify a configuration of the switch.

4. The automotive radar system of claim 3, wherein the controller is configured to toggle the switch to interleave the first local oscillator signal and the second local oscillator signal at the input terminal of the signal splitter.

5. The automotive radar system of claim 4, wherein:

the follower radar device includes an output pin and the second local oscillator signal generator is connected to the output pin;

the leader radar device includes an input pin connected to the second terminal of the switch; and the output pin is electrically connected to the input pin.

6. The automotive radar system of claim 5, wherein the electrical connection includes a conductive trace and a length of the conductive trace is less than four centimeters.

7. The automotive radar system of claim 4, further comprising a second switch connected between the first local oscillator signal generator and the first transmitter.

8. The automotive radar system of claim 7, wherein the controller is configured to modify a configuration of the second switch to cause the first local oscillator signal to be provided to the first transmitter.

9. An automotive radar system, comprising:

a signal splitter;

a leader radar device, including:

a first local oscillator signal generator including a first phase locked loop circuit configured to generate a first local oscillator signal using a first clock signal, a switch having a first terminal connected to the first local oscillator signal generator, a second terminal, and a third terminal connected to an input terminal of the signal splitter, and a first transmitter and a first receiver configured to transmit and receive first radar signals, respectively;

a follower radar device, including:

a second local oscillator signal generator including a second phase locked loop circuit configured to generate a second local oscillator signal, wherein the second terminal of the switch is connected to the second local oscillator signal generator, and a second transmitter and a second receiver configured to transmit and receive second radar signals, respectively, wherein the signal splitter is configured to output a first signal to the first transmitter and receiver along a first path and a second signal to the second transmitter and receiver along a second path based on an input signal received at the input terminal of the signal splitter, wherein the first path and the second path have equal lengths, and wherein the first signal and the second signal have the same frequency and phase; and a controller configured to selectively put the switch in at least one of a first configuration in which the first terminal is connected to the third terminal and a second configuration in which the second terminal is connected to the third terminal.

10. The automotive radar system of claim 9, wherein the controller is configured to modify a configuration of the switch to alternate between the first local oscillator signal being supplied to the input terminal of the signal splitter and the second local oscillator signal being supplied to the input terminal of the signal splitter.

11. The automotive radar system of claim 9, wherein the controller is configured to toggle the switch to interleave the first local oscillator signal and the second local oscillator signal at the input terminal of the signal splitter.

12. The automotive radar system of claim 9, wherein:

the follower radar device includes an output pin and the second local oscillator signal generator is connected to the output pin;

the leader radar device includes an input pin connected to the second terminal of the switch; and an electrical connection is formed between the output pin and the input pin.

13. The automotive radar system of claim 12, wherein the electrical connection includes a conductive trace and a length of the conductive trace is less than four centimeters.

14. The automotive radar system of claim 9, further comprising a second switch connected between the first local oscillator signal generator and the first transmitter.

15. The automotive radar system of claim 14, wherein the controller is configured to modify a configuration of the second switch to determine whether the first local oscillator signal is provided to the first transmitter.

16. The automotive radar system of claim 9, wherein the leader radar device is implemented within a first integrated circuit and the follower radar device is implemented within a second integrated circuit.

17. A radar device, comprising:

a first local oscillator signal generator including a first phase locked loop circuit configured to generate a first local oscillator signal using a clock signal;

a switch having a first terminal connected to the first local oscillator signal generator, a second terminal, and a third terminal configured to connect to an input terminal of a signal splitter, wherein the second terminal is configured to connect to a second radar device to receive a second local oscillator signal; and first transmitters and receivers configured to transmit and receive first radar signals using a selected one of the first local oscillator signal and the second local oscillator signal based on a state of the switch, wherein the signal splitter is configured to output a first signal to the first transmitter and receiver along a first path and a second signal to a second transmitter and a second receiver of the second radar device along a second path based on an input signal received at the input terminal of the signal splitter, wherein the input signal is the selected one of the first local oscillator signal and the second local oscillator signal, and wherein the first path and the second path have equal lengths.

18. The radar device of claim 17, wherein the second radar device is a follower radar device including a second local oscillator signal generator including a second phase locked loop circuit configured to generate the second local oscillator signal using a clock signal.

19. The radar device of claim 17, wherein the switch is configured to be controlled by a controller that is configured to toggle the switch to interleave the first local oscillator signal and the second local oscillator signal at the input terminal of the signal splitter.

* * * * *